United States Patent [19]

Mähl

[11] Patent Number: 5,800,710

[45] Date of Patent: Sep. 1, 1998

[54] METHOD AND APPARATUS FOR THE BIOCHEMICAL PURIFICATION OF A LIQUID MEDIUM

[75] Inventor: Dieter Mähl, Wensin, Germany

[73] Assignee: Shieer Globe N.V., Curacao, Netherlands

[21] Appl. No.: 737,511

[22] PCT Filed: May 24, 1995

[86] PCT No.: PCT/NL95/00183

§ 371 Date: Nov. 13, 1996

§ 102(e) Date: Nov. 13, 1996

[87] PCT Pub. No.: WO95/32923

PCT Pub. Date: Dec. 7, 1995

[30] Foreign Application Priority Data

May 27, 1994 [NL] Netherlands ............... 9400874
Sep. 2, 1994 [NL] Netherlands ............... 9401439

[51] Int. Cl.$^6$ ............................................. C02F 3/08
[52] U.S. Cl. .................. 210/617; 210/661; 210/150; 210/221.2; 210/274; 210/290
[58] Field of Search .......................... 210/617, 618, 210/661, 150, 151, 218, 221.2, 274, 290, 503

[56] References Cited

U.S. PATENT DOCUMENTS 4,256,573  3/1981  Shimodaira et al. ............... 210/618

FOREIGN PATENT DOCUMENTS 0 430 886   6/1991   European Pat. Off. .
2 583 406  12/1986   France .
2 031 941   1/1972   Germany .
WO/9325485 12/1993   WIPO .

*Primary Examiner*—Ivars Cintins
*Attorney, Agent, or Firm*—Young & Thompson

[57] ABSTRACT

A method and apparatus for the biochemical purification of a contaminated liquid medium, in which the liquid medium is passed through granular filter material provided in a holder and in which the granular filter material (12) contained in the holder is set in motion, preferably with the aid of an injected gas such as air. Microorganisms and/or an active water for microorganisms can be added to the holder. The filter material may comprise a mixture of lava and sand, for example 28% to 38% sand and 61% to 71% lava. The granule size of the sand is 0.3 to 1.2 mm and the granule size of the lava is 2 to 10 mm. The main flow of the medium to be purified and the injected gas are oppositely directed. To set the filter material in motion, use is made of an inner tube (33) placed in an outer tube (32), gas being blown through the inner tube under the lower end of the inner tube (31) so that gas and filter material drawn in at the lower end of the tubes and medium are transported upward through the inner tube.

20 Claims, 3 Drawing Sheets

METHOD AND APPARATUS FOR THE BIOCHEMICAL PURIFICATION OF A LIQUID MEDIUM

The present invention relates to a method for the biochemical purification of a liquid medium containing contaminants, the liquid medium being passed through a bed provided in a holder and comprising a granular filter material.

Such methods are generally known. In these methods, the liquid medium is generally purified because the granular filter material retains and/or absorbs contaminants and lets the liquid medium through.

The object of the present invention is to provide an improved method and apparatus of the abovementioned type.

According to the invention, this object is achieved in that the granular filter material contained in the holder is set in motion. In this connection, the granular filter material is preferably set in motion by the injection of a gas, such as air. On the granular material there forms a layer, generally a slimy layer, containing bacteria and/or microorganisms which absorb and/or convert the contaminants, in which process they purify the liquid medium again chemically. Surprisingly, the purifying action of the bacteria and/or microorganisms appears to be considerably assisted if the granular material is set in motion. In this process, the purifying action is further stimulated by using a suitable gas for setting in motion. Such a suitable gas may in many cases be air. The sitting up of the bed is counteracted by the granular filter material being circulated.

According to the invention, it may be advantageous for the further improvement of the purifying action if microorganisms and/or an activator for microorganisms are/is fed to the holder. Use can also be made of microorganisms which are already present in the medium and/or on the filter material. Furthermore, known further purifying agents for, for example, aqueous systems, as well as nutrients for the microorganisms can be added, as is generally known to persons skilled in the art. Instead of, or in addition to, microorganisms, bacteria and/or an activator for bacteria may also be supplied.

According to the invention, the support function of the filter material for microorganisms and/or bacteria can be appreciably improved if the filter material comprises porous granules in which the microorganisms and/or bacteria are able to lodge. The more porous the granules, the greater is the contact surface of the medium to be purified with the bacteria and/or microorganisms.

All the known filter materials for biological filters, such as, in particular, porous granules, may be used. These materials may optionally be formed into granules having the desired size before use. Filter materials and purifying agents provided on granular support materials may also be used.

A BWC (Bio Water Clean), such as the BRC (Bio Reactor Clean) related thereto, may be used as activator.

A typical composition for Bio Water Clean is:
dry matter: 95 g/l
moisture content: 905 g/l
organic matter: 50 g/l
inorganic matter: 45 g/l
Organic matter
protein: 7%
carbohydrates: 45%
alginic acid: 24.5%
mannitol: 3.7%
miscellaneous: 16.8%
Growth-stimulating agents
adenine (cytokinin): 0.02%
IAA: 0.03%
ABA: 0.01%
Inorganic matter (ash)
essential constituents: essential trace elements
(macro-nutrients) (micro-nutrients)
Total nitrogen (N)1.5%
phosphorus (P)0.05%
potassium (K)2.5%
calcium (Ca)1.2%
sulphur (S)3.7%
copper (Cu) 5 ppm
iron (Fe)1200 ppm
manganese (Mn)12 ppm
zinc (Zn)100 ppm
boron (B)80 ppm
molybdenum (Mo)1 ppm The elements normally found furthermore also comprise: aluminium, antimony, barium, bromine, cadmium, chlorine, chromium, cobalt, fluorine, iodine, lead, mercury, nickel, selenium, silicon, sodium, strontium, tin, tungsten and vanadium.

If Bio Water Clean is used with the filter according to the application, the following advantages are obtained if the filtration water is recirculated to the glasshouse for watering plants:

better taste, shelf life and quality of the plants and/or cultivated products;

better absorption of metal ions, such as $Na^+$, $K^+$, $Mg^+$, by the plants.

This makes it possible to use, for example, tap water and/or ditch water in the watering of glasshouses without undesirable build-up of salts in the recirculation system, for example in the mats on which the plants are cultivated.

According to the invention, it is advantageous, in particular, if the filter material comprises fairly large, preferably porous, granules and fairly small granules. The fairly small granules are then able to fill up the gaps between the fairly large granules so that the contact between the granules and the filter material is improved.

According to the invention, a very suitable filter material comprises a mixture of lava and sand. Such a mixture is preferably composed of 28% to 38% sand and 61% to 71% lava. A so-called filtering sand, for example, can be used as sand.

Sand having a granule size of 0.3 mm to 1.2 mm, preferably 0.5 mm to 1 mm and lava having a granule size of 2 mm to 10 mm, preferably 4 mm to 8 mm, appear to give very good results, in particular if these granule sizes are used in combination. Sand and lava having such granule sizes can readily be set in motion and form good supports for microorganisms and bacteria, with a sufficiently large total contact surface. Under these circumstances, the spaces between the fairly large lava granules are filled by the fairly small sand granules, as a result of which the contact of the medium to be purified with the lava granules, and therefore with the bacteria and/or microorganisms supported thereby and/or therein, is improved.

According to the invention, a very good purifying action is obtained if contaminated liquid medium is supplied at the top of the filter material, purified liquid medium is removed at the bottom of the filter material and the filter material is kept in motion by injecting a gas, such as air, into the filter material essentially in a vertical upwards direction. Under these circumstances, the contaminated liquid medium is forced from the top downwards through the filter material, while the filter material itself is set in motion by utilizing the buoyancy of the gas bubbles, with the result that a circulation of filter material occurs in the bed.

According to a further advantageous method according to the invention, liquid medium is also forced upwards by the injected gas together with the filter material. In this case, the purifying action is improved because the liquid medium to be purified is also circulated through the holder. The recirculation of the liquid medium to be purified and filter material takes place, according to the invention, in a very advantageous way because the gas is injected at the lower end of a tube placed essentially vertically in the bed containing filter material and projecting above it. As a result of arranging for the liquid medium to be purified, filter material and gas to circulate in such a way, via a tube, the liquid medium to be purified is brought into intimate contact with bacteria and microorganisms which are supported by the granules and which can in turn be additionally activated again by the injected gas, for example as a result of the provision of oxygen.

The invention furthermore relates to an apparatus for carrying out the method according to the invention. Such an apparatus comprises a holder with supply means for contaminated liquid medium, removal means for purified liquid medium and means for setting in motion granular filter material to be provided in the holder. Preferably, a granular filter material having a granule size of less than 20 mm is provided in the holder. Granules having such a size, such as porous lava granules, can readily be set in motion, form a good support for microorganisms and bacteria and form a good contact surface between, on the one hand, the microorganisms and/or bacteria and, on the other hand, the liquid medium to be purified.

The means for removing the purified liquid medium advantageously comprise a drainage tube or system of drainage tubes provided at the base of the holder. Such drainage tubes are generally known and can be provided, for example, on the base of the holder and remove purified liquid medium without entraining the granular filter material.

The means for setting the granular filter material in motion preferably comprise at least one nozzle for injecting a gas, the nozzle being provided at a height in the holder which is such that it will be situated in the bed containing filter material to be provided in the holder. In this connection, the nozzle is preferably provided in such a way that the gas stream to be injected is directed essentially upwards.

The medium may be any liquid containing impurities, such as aqueous drainage and feed flows of fabrication processes, market gardens and farms, and the like. Further applications of the method and apparatus according to the invention will be clear to those skilled in the art.

The invention will be explained in greater detail below with reference to an example of an embodiment shown in a drawing. In the drawing.

Figure 1:
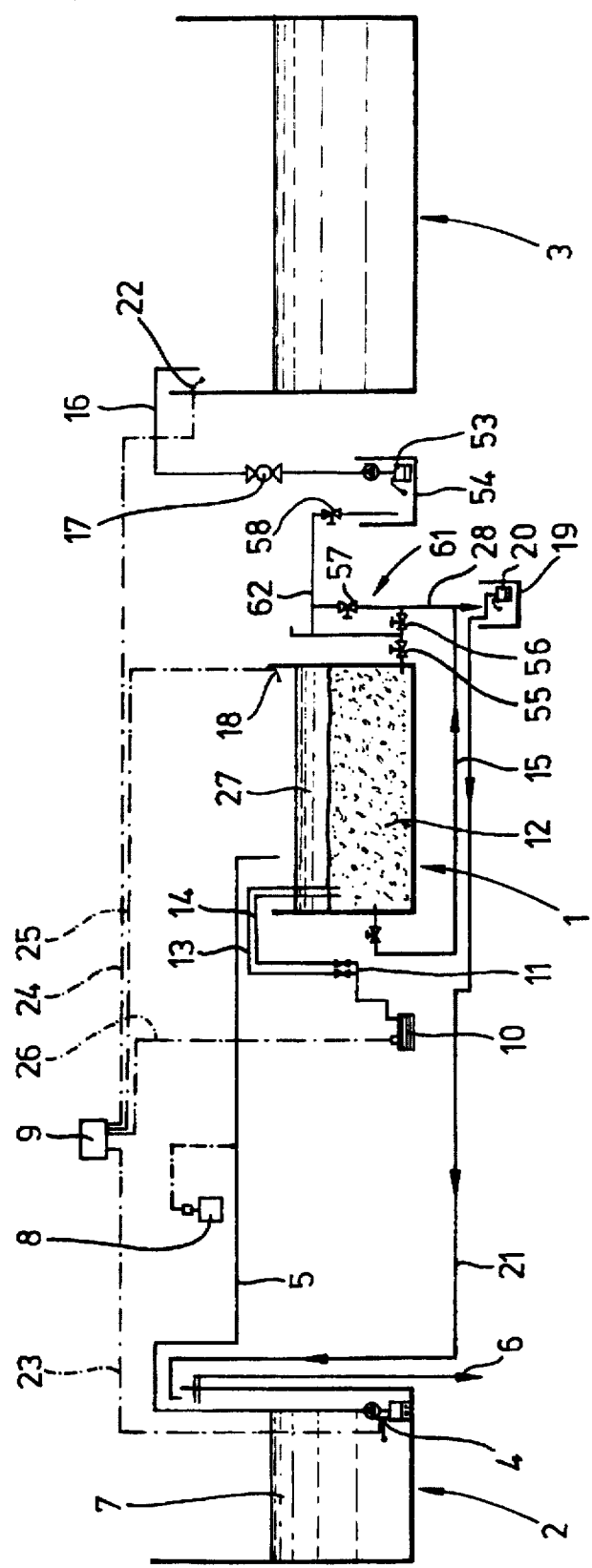
FIG. 1 shows a diagram of a system in which a purifying apparatus according to the invention is incorporated.

FIG. 1 shows a purification system for liquids comprising three holders, viz. 1, 2 and 3. Holder 1 is the reaction vessel in which the biochemical purification of the liquid takes place, holder 2 is a feed buffer containing liquid to be purified, and holder 3 is a removal buffer containing purified liquid. It will be clear that the feed buffer 2 and the removal buffer 3 may be connected, respectively, to feed pipes and drainage pipes which are not shown. Liquid to be purified is fed from the feed buffer 2 to the reaction vessel 1 with the aid of a pump apparatus 4 via a pipe 5, the pipe 5 discharging into said reaction vessel 1 at the top. Feed buffer 2 is furthermore provided with an overflow pipe 6, via which contaminated liquid 7 can be removed if the feed buffer 2 becomes too full.

Microorganisms, bacteria or activators for microorganisms and/or bacteria can be fed to the reaction vessel 1 by means of a dispensing unit 8 connected to the feed pipe 5.

A drain 15 for purification purposes, to be described below, is connected to the reaction vessel 1, which removal pipe 15 discharges into a collecting tank 19. Air-injection means 10 are connected via a distributor 11 having two feed pipes 13 and 14 for air, by means of which pipes air can be injected into the reaction vessel 1 in order to set the filter material 12 in motion. The reaction vessel 1 is furthermore provided with a level switch 18 which emits a signal if the level of the liquid 27 in the reaction vessel 1 reaches a certain height.

Depending on the setting of the stopcocks 55, 56, 57 and 58, liquid is removed from the reaction vessel 1 via a pipe system 61 to the collecting tank 19 or the collecting tank 54. In this connection, the liquid can be removed to collecting tank 19 if the liquid is insufficiently purified, for example when the installation is started up or restarted. From the collecting tank 19, the liquid can then be fed back to the feed buffer 2 via pipe 21 by means of a pump 20.

If the liquid is sufficiently purified, it can be fed to collecting tank 54 from the reaction vessel. The purified liquid can then be removed from collecting tank 54 to the removal buffer 3 by means of a pump 53 via a pipe 16 and a flowmeter 17. In this connection, the flowmeter 17 may be a flowrate meter and/or a cumulative meter which counts the total amount of liquid conveyed with time.

Pipe section 62 of the pipe system 61 extends essentially horizontally at a level which is higher than the top of the bed filter material in the reaction vessel 1. This achieves the result that the liquid level of the liquid present in the reaction vessel 1 is always sufficiently high for the bed to be covered by liquid and not able to dry out.

The removal buffer 3 is provided with a level switch 22 which is able to emit a signal if the level of the purified liquid reaches or exceeds a certain value.

The purification system can be regulated with the aid of the control unit 9. For this purpose, the control unit 9 is connected via a signal line 23 to the pump 4 in the feedstock buffer, via a signal line 26 to the compressor means, via signal line 24 to the level switch 22 in the removal buffer, and via signal line 25 to the level switch 18 in the reaction vessel. It will be clear that the control unit 9 can be connected via further signal paths which are not shown to, for example, the dispensing unit 8, the distributor 11, the flowmeter 17, or one or more of the valves, or control valves, which can be shut off.

The operation of the purification system per se shown in FIG. 1 will be clear to a person skilled in the art. The operation of the reaction vessel 1 will now be dealt with in greater detail below.

Figure 2:
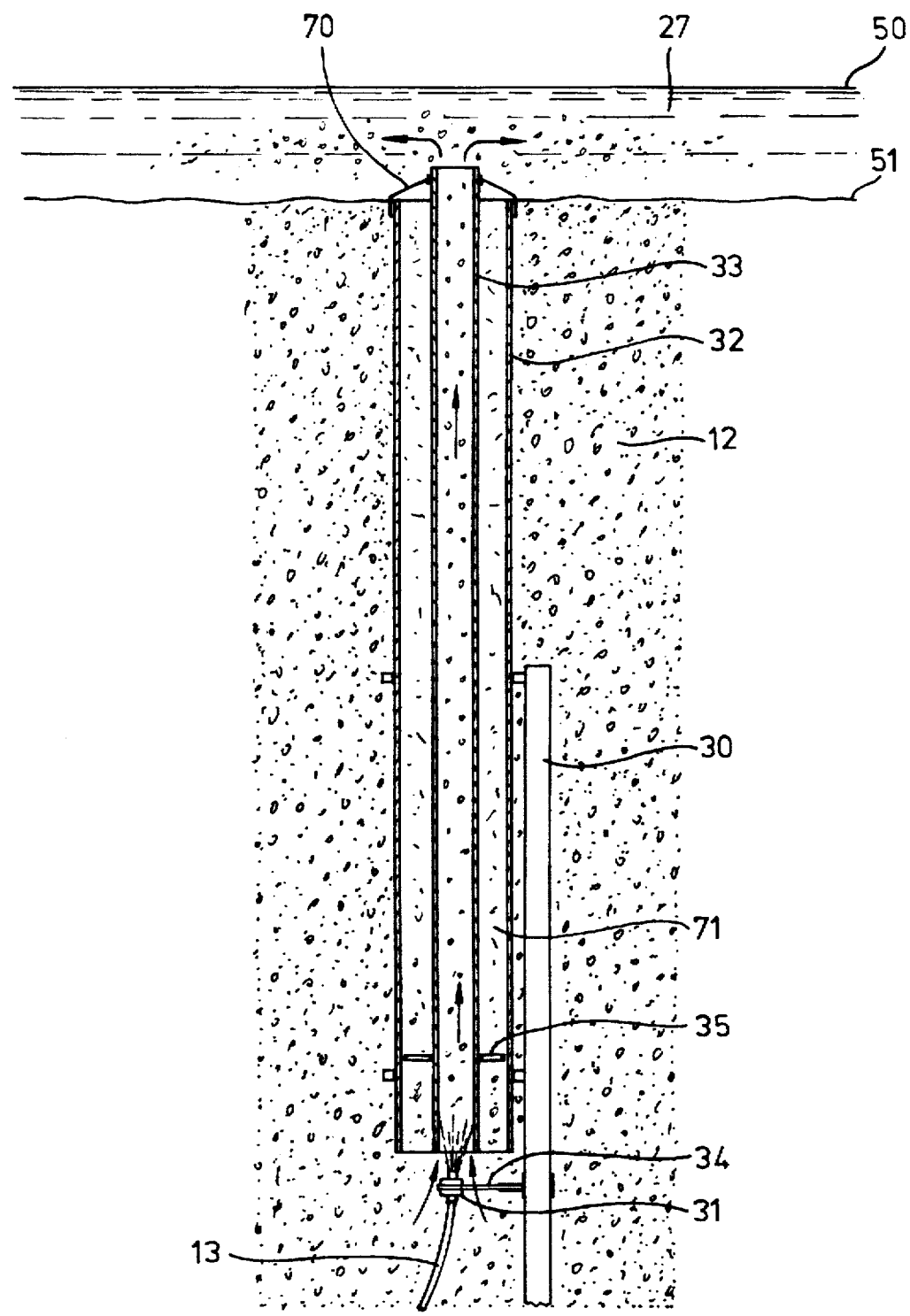
FIG. 2 shows a unit for setting the filter material in motion.

FIG. 2 shows a detailed view of a section of the reaction vessel 1.

The reaction vessel 1 contains a bed of a granular filter material which is composed of a mixture of approximately 33% sand and 66% lava. The granule size of the sand, preferably filter sand, is approximately 0.5 to 1 mm and the granule size of the porous lava is approximately 4 to 8 mm. The sand granules will therefore fill up the spaces between the lava granules, as a result of which the contact between the liquid and the lava granules is improved.

As can be seen in FIG. 2, the level 50 of the liquid 27 is higher than the level 51 of the filter material 12, with the result that the said filter material does not dry out.

Provided in the reaction vessel is a circulation unit. Said circulation unit comprises an inner tube 33 and an outer tube 32. The inner tube 33 is secured centrally in the outer tube 32 by means of a centring device 35. The outer tube 32 is attached in turn to a support 30 which may be mounted, for example, on the base of the reaction vessel. Attached to the support 30 by means of a support arm 34 is a nozzle 31 connected to a feed pipe 13 for air. Said nozzle 31 is situated below the inner tube 33 and is directed in such a way that the gas flowing out of it is blown essentially into the inner tube 33.

Provided at the top of the circulation unit is a lid 70. Said lid 70 is provided with an opening through which the inner tube 33 projects, and said lid 70 furthermore fits over the outer tube 32. The space formed between the inner tube 33 and the outer tube 32 is thus essentially closed off at the top, and the inner tube 33 is centred in the outer tube 32 by the lid 70. This lid construction 70 appreciably simplifies any maintenance operations on the circulation unit. After all, the lid 70 is accessible from the top, with the result that it can be removed, after which the inner tube 33 can also be removed from the outer tube 32. The nozzle 31 can then be inspected and, if necessary, cleaned via the outer tube 32. It will be clear that the filter material does not need to be removed from the holder during this process, which offers great practical advantages.

As can furthermore be seen in FIG. 2, the top end of the inner tube 33 is situated above the level 51 of the filter material 12 and higher than the top end of the outer tube 32. The top end of the outer tube 32 is, according to FIG. 2, approximately at the same height as the level 51 of the filter material 12, with the result that the lid 70 remains readily accessible. The top end of the outer tube 32 may, however, also be higher than said level 51 of the filter material 12.

A flow of filter material, air and liquid indicated by the arrows is generated as a consequence of the air injected into the inner tube 33 at the injection point via the nozzle 31. As a result of the action of the injected air, liquid and filter material are drawn in at the bottom end of the circulation unit and transported upwards through the inner tube. Because the inner tube 33 projects above the filter bed, the filter material fed upwards will spread over the bed as indicated. The liquid drawn in at the bottom end of the circulation unit has already been passed through the bed and has already been to some extent purified thereby. Because the liquid is fed upwards again, it has to be fed through the bed again, which benefits the purifying action.

During the transport through the inner tube, an intimate contact is brought about between the granular filter material, the liquid to be purified and the injected gas, for example air. Said intimate contact is extremely beneficial for the purification of the contaminated liquid. The purified liquid is, as stated earlier, removed by means of drainage pipes provided at the bottom of the reaction vessel, with the result that said liquid is transported completely through the layer of filter material 12 from top to bottom, the circulation via the circulation unit ensuring that this takes place several times.

The cross-sectional dimensions of the outer tube 32 are such that, at least at the bottom end of the inner tube 33, a chamber 71 is provided around said bottom end. In the example shown in FIG. 2, said chamber 71 extends around the entire inner tube. Said chamber is open at the bottom. In said chamber, a swirling of granules of the filter material which whirl up and fall back again is generated by means of the air injected via the nozzle 31. Said air will therefore gradually be fed into the swirling chamber 71 as well as into the inner tube. The granules falling back out of the swirling chamber 71 will fall onto the filter material present underneath the bottom end of the circulation unit and set said filter material in motion as a result, the supply of filter material to the inner tube 33 thereby being improved. This counteracts the possibility that a space without filter material forms beneath the bottom end of the circulation unit.

To counteract an accumulation of air in the swirling chamber, venting openings, which are not shown, are provided. Said venting openings may be provided, for example, at the top of the circulation unit in the wall of the inner tube 33, with the result that a connection is provided at this point between the swirling chamber and the interior of the inner tube.

Figure 3:
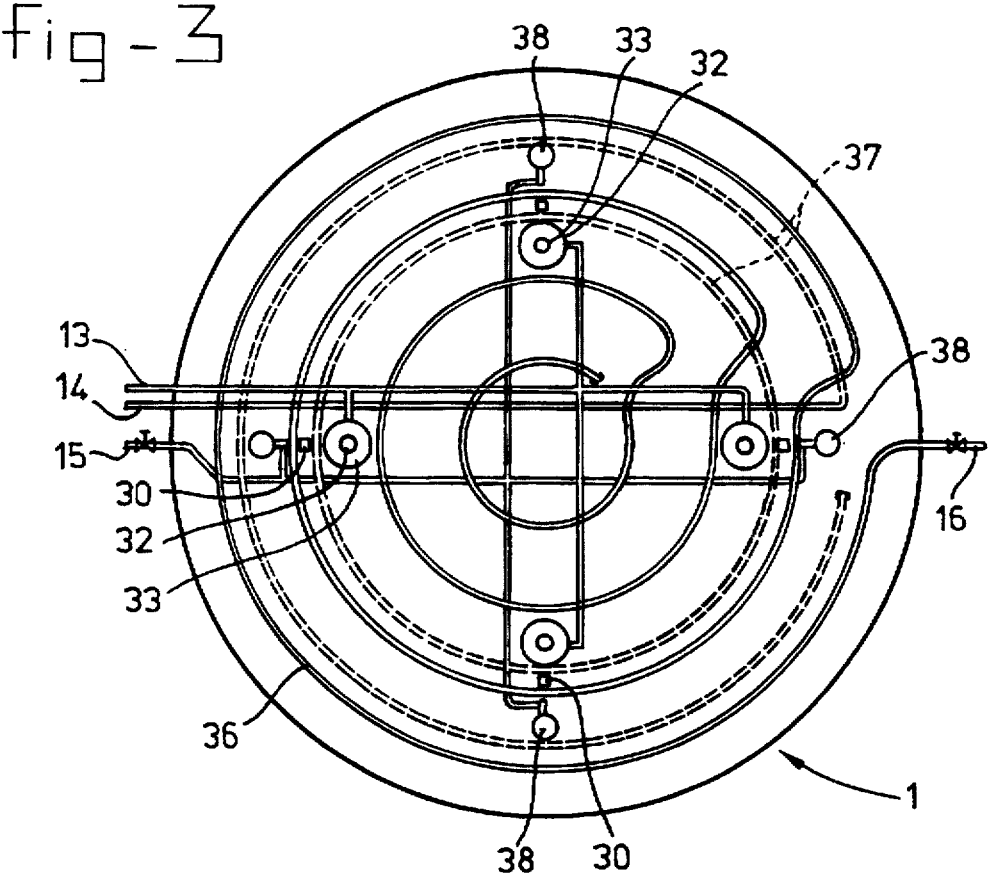
FIG. 3 shows a plan view of an apparatus according to the invention for the biochemical purification of a liquid.
Figure 4:
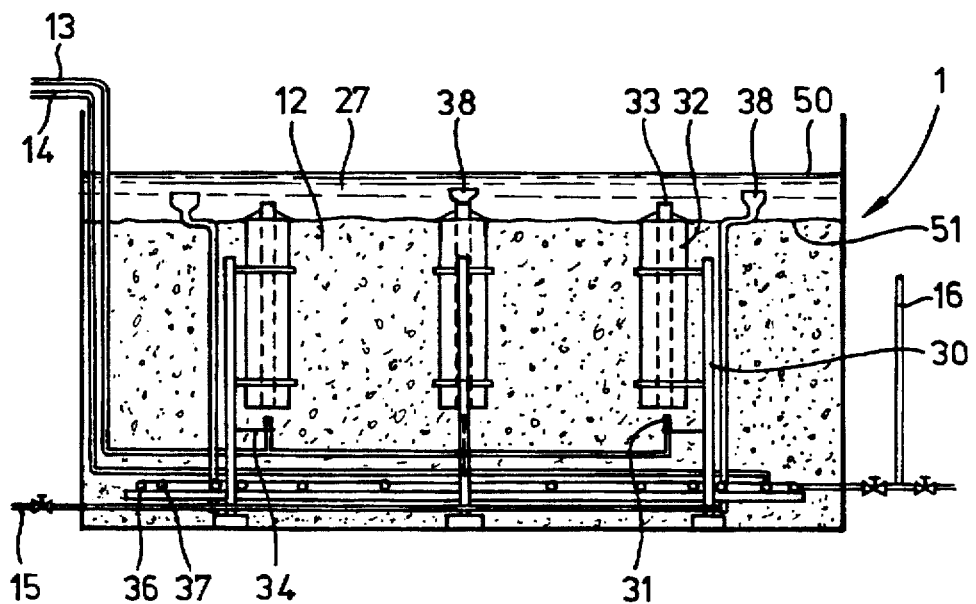
FIG. 4 shows a cross section through the apparatus according to FIG. 3.

FIGS. 3 and 4 show, respectively, a plan view and a cross section of a reaction vessel according to the invention. As can be seen from these figures, the removal pipe 16 for purified liquid is connected to a drainage system 36 which is provided spirally at the base of the reaction vessel. Furthermore, it can be seen in these figures that the pipe 14 for supplying a gas, such as air, discharges into a pipe system 37 likewise provided spirally at the base of the reaction vessel. Said pipe system, such as, for example, a perforated tube, is provided with a multiplicity of nozzles in order to be able to inject additional gas into the filter material. Said additional gas can be used in order to set the filter material additionally in motion, at the same time as setting in motion by means of the circulation unit. But said pipe system 37 can also be used for setting the filter material very vigorously in motion at set times so that dirt present in the filter material is blown upwards and can be removed via the funnels 38 which are connected to the removal pipe 15. In this case, the filter material present in the reaction vessel is itself then subjected, therefore, to a purification treatment at set times.

In FIGS. 3 and 4, it can furthermore be seen that a multiplicity of circulation units are provided in the reaction vessel, and specifically, four circulation units. It will, however, be clear that, depending on the size of the reaction vessel, a greater or lesser number of circulation units may be provided. Said circulation units are preferably provided in a regular pattern. Thus, the circulation units may be distributed at regular angular distances over a circle, as is the case in FIG. 3. However, a plurality of such circles containing circulation units may be provided in the reaction vessel. It may furthermore be very advantageous to provide a further circulation unit in the centre of the reaction vessel, but this is not shown in FIG. 3 since this would not benefit the clarity of the figure.

It will be clear that many variants falling within the scope of the invention are conceivable in relation to the exemplary embodiment of the invention described above.

The method and apparatus according to the invention can be very advantageously used for purifying irrigation water collected in the cultivation of plants in glasshouses, after which the purified irrigation water can be reused for irrigation.

The use of the method according to the application will now be explained by reference to the following, nonrestrictive examples.

EXAMPLE 1

Drainage water from a glasshouse was filtered with the filter according to the application using Bio Water Clean.

The aerobic microbial count and the amount of fungi were determined upstream and downstream of the filter. The results were as follows:

| Analytical result of microbiological examination of drainage water | | |
|---|---|---|
| | I | II |
| aerobic microbial count/ml | 500,000 | 70,000 |
| fungi/ml | 100 | <10 |

I: upstream of filter
II: downstream of filter

This reveals the appreciable biological purification which is obtained by the method according to the invention.

EXAMPLE 2
Plant sap analyses

To determine the effect of the method according to the invention, a test was carried out in which, in one holding, a normal cultivation was used until 1 Jun. 1994, while, in another holding, the invention was used from 1 Apr. 1994, Bio Water Clean being given along with the feed solution.

The differences between the two test projects were determined, inter alia, on the basis of analyses carried out weekly on plant sap originating from young, fully grown leaf. The most important chemical data follow below.

| | 27/04/94 | 04/05/94 | 11/05/94 | 19/05/94 | 26/05/94 | 02/06/94 | 08/06/94 | 16/06/94 |
|---|---|---|---|---|---|---|---|---|
| | Untreated until 1 June 1994 | | | | | | | |
| EC | 17.0 | 14.1 | 13.6 | 15.8 | 14.8 | 12.4 | 12.0 | 11.9 |
| pH | 6.3 | 6.3 | 6.4 | 6.5 | 6.3 | 6.2 | 6.1 | 6.4 |
| K | 6.34 | 5.46 | 4.88 | 5.98 | 5.49 | 4.69 | 4.58 | 3.99 |
| | 7.0 | 2.0 | 1.0 | 9.0 | 6.0 | 3.0 | 4.0 | 6.0 |
| Ca | 946.0 | 887.0 | 1.07 | 1.13 | 1.32 | 1.35 | 1.28 | 1.29 |
| | | | 8.0 | 9.0 | 0.0 | 2.0 | 9.0 | 1.0 |
| Mg | 311.0 | 253.0 | 254.0 | 231.0 | 272.0 | 257.0 | 304.0 | 364.0 |
| Na | 289.0 | 230.0 | 262.0 | 249.0 | 327.0 | 204.0 | 205.0 | 222.0 |
| $NO_3$ | 1.79 | 1.50 | 1.61 | 1.85 | 1.60 | 1.29 | 1.33 | 887.0 |
| | 2.0 | 4.0 | 6.0 | 9.0 | 7.0 | 6.0 | 3.0 | |
| Si | 31.4 | 18.7 | 40.6 | 39.4 | 38.3 | 37.7 | 33.3 | 34.1 |
| | Treated from 1 April 1994 onwards | | | | | | | |
| EC | 16.7 | 13.7 | 15.1 | 14.9 | 12.8 | 11.3 | 10.6 | 11.2 |
| pH | 6.3 | 6.4 | 6.3 | 6.3 | 6.1 | 6.1 | 6.0 | 6.1 |
| K | 6.08 | 5.31 | 5.73 | 5.58 | 4.62 | 4.57 | 4.26 | 3.85 |
| | 5.0 | 7.0 | 5.0 | 5.0 | 6.0 | 2.0 | 2.0 | 8.0 |
| Ca | 1.36 | 1.41 | 1.55 | 2.06 | 1.76 | 1.98 | 1.93 | 1.64 |
| | 9.0 | 6.0 | 0.0 | 8.0 | 1.0 | 0.0 | 0.0 | 8.0 |
| Mg | 403.0 | 358.0 | 421.0 | 464.0 | 381.0 | 397.0 | 419.0 | 448.0 |
| Na | 349.0 | 287.0 | 363.0 | 397.0 | 297.0 | 201.0 | 198.0 | 191.0 |
| $NO_3$ | 1.68 | 1.43 | 1.90 | 1.59 | 1.11 | 873.0 | 779.0 | 688.0 |
| | 4.0 | 5.03 | 7.0 | 8.0 | 5.0 | | | |
| Si | 31.4 | 34.0 | 44.1 | 51.9 | 46.6 | 45.1 | 52.3 | 38.2 |

The fact that the crop was more vigorous and healthier in the case of the treated site was also clearly evident from the analytical figures. In particular, the Ca content is sometimes 40–50% higher. This reveals that the Ca transport from root tops to plant parts, which fairly frequently presents problems, functions well here. As is known, calcium is used in the plant for building up cell walls and membranes. In melon cultivation, this is manifested in a sturdier fruit with a longer shelf life. Further advantages are:

Advances in terms of production on the previous year despite the duller spring.

Greater production, certainly in kilograms. An increase in production of more than 10% is among the possibilities.

The average piece weight is markedly higher. The grades 5 and 6 are harvested per box, with an average piece weight of 1500 or 1200 grams, respectively.

The crop is more vigorous and less sensitive to disease and stress, particularly to Pythium, Mycosphaerella, etc., and produces more leaf.

The sugar content of the melons is on average 1.5% higher (now 11–12%).

As a result of the sturdier cell structure, the fruits keep for still longer.

I claim:

1. In a method for the biochemical purification of a liquid medium containing impurities, wherein the liquid medium is passed through a bed containing granular filter material provided in a holder, wherein contaminated liquid medium is supplied at the top of the filter material, wherein purified liquid medium is removed at the bottom of the filter material, wherein a tube is placed essentially vertically in the bed containing filter material and projects above the latter, wherein at least at the bottom end of the tube a chamber is provided around the bottom end of the tube, the chamber being open at its bottom, wherein near the bottom end of the tube a gas is injected such that as a consequence of the ejector action of the injected gas filter material and medium are drawn in from the surrounding of the bottom end of the tube, that the injected gas feeds said filter material and medium drawn in upwards via the tube, and that the filter material fed upwards is spread over the bed; the improvement wherein the gas is injected essentially in a vertically upwards direction from below the bottom end of the tube such that the gas is blown into the tube for feeding upward filter material and medium and blown into the chamber such that a swirling of bottom material whirling up and falling back again is brought about in said chamber with the result that bottom material falling back sets the bottom material around the bottom end of the tube in motion.

2. Method according to claim 1, wherein microorganisms and/or an activator for microorganisms are/is fed to the holder.

3. Method according to claim 1 wherein the filter material contains porous granules.

4. Method according to claim 1, wherein the filter material comprises large and small granules.

5. Method according to claim 1, wherein the filter material comprises a mixture of lava and sand.

6. Method according to claim 5, wherein the sand has a granule size of 0.3 mm to 1.2 mm.

7. Method according to claim 5, wherein the lava has a granule size of 2 mm to 10 mm.

8. Method according to claim 1 wherein the filter material comprises 28% to 38% sand and 61% to 71% lava.

9. In a device for the biochemical purification of a liquid medium containing contaminants, comprising a holder (1) with feed means (5) for contaminated liquid medium, removal means (61) for purified liquid medium and means (31, 33) for setting granular filter material (12) to be provided as a bed in the holder (1) in motion, wherein said means for setting the filter material in motion comprise an essentially vertical tube and at least one nozzle for injecting a gas, in which the tube is situated in the holder such that it will be situated in the bed containing filter material to be provided in the holder, the top end of the tube being higher than the top of the filter bed to be provided in the holder, and in which the nozzle is provided near the lower end of the tube; the improvement wherein a chamber open at the bottom is formed around the lower end of the tube, and the at least one injection nozzle is directed essentially upwards to blow gas into the tube and into the chamber.

10. Device according to claim 9, wherein a bed of granular filter material having a granule size of less than 20 mm is provided in the holder.

11. Device according to claim 9, wherein the granular filter material comprises porous granules.

12. Device according to claim 9, wherein the granular filter material comprises a mixture of lava and sand, containing 28% to 38% sand and 61% to 71% lava.

13. Device according to claim 12, wherein the granule size of the sand is 0.3 mm to 1.2 mm.

14. Device according to claim 12, wherein the granule size of the lava is 2 mm to 10 mm.

15. Device according to claim 12, wherein the granule size of the sand is 0.5 mm to 1 mm.

16. Device according to claim 12, wherein the granule size of the lava is 4 mm to 8 mm.

17. Device according to claim 9, wherein the removal means for the purified liquid medium comprise a drainage tube provided at the base of the holder.

18. Device according to claim 9, wherein the feed means discharge in the holder above the filter material to be provided in the holder.

19. Device according to claim 9, wherein the section of the vertical tube (33) situated in the bed is placed in a casing (32) and wherein a free space (71) which is open at the bottom is present between the casing (32) and the vertical tube (33).

20. Device according to claim 9, wherein the holder is provided with a multiplicity of vertical tubes which are distributed evenly over the holder and have nozzles provided at the bottom.

* * * * *